United States Patent
Nishio et al.

(10) Patent No.: US 6,777,657 B2
(45) Date of Patent: Aug. 17, 2004

(54) FOCUSING CONTROLLER FOR FOCUS JUMP CONTROL BETWEEN RECORDING LAYERS OF MULTILAYER DISK

(75) Inventors: Yoshimichi Nishio, Kawagoe (JP); Yoshihiro Hashizuka, Kawagoe (JP); Kazunori Matsuo, Kawagoe (JP); Takeshi Sato, Kawagoe (JP); Morio Nozaki, Kawagoe (JP); Hitoshi Yamazaki, Kawagoe (JP); Kazuhiko Oogami, Kawagoe (JP); Yoshitaka Makino, Kawagoe (JP); Hideaki Yoshimura, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/114,027

(22) Filed: Apr. 3, 2002

(65) Prior Publication Data

US 2002/0145101 A1 Oct. 10, 2002

(30) Foreign Application Priority Data

Apr. 5, 2001 (JP) ........................................ 2001-107153

(51) Int. Cl.[7] .............................................. G11B 7/09
(52) U.S. Cl. .................................. 250/201.5; 369/44.25
(58) Field of Search ........................... 250/201.2, 201.4, 250/201.5; 369/44.11, 44.13, 44.14, 44.35

(56) References Cited

U.S. PATENT DOCUMENTS

| | | | | |
|---|---|---|---|---|
| 5,675,561 A | * | 10/1997 | Yoshioka | ................ 369/44.25 |
| 5,710,748 A | * | 1/1998 | Hofer | ...................... 369/44.35 |
| 5,903,530 A | | 5/1999 | Tateishi et al. | |
| 5,974,009 A | * | 10/1999 | Tamura et al. | ........... 250/201.5 |
| 5,978,331 A | * | 11/1999 | Ceshkovsky | ............. 369/44.29 |
| 6,147,942 A | | 11/2000 | Abe et al. | |

FOREIGN PATENT DOCUMENTS

EP          0 919 994 A2    6/1999

* cited by examiner

Primary Examiner—Stephone B. Allen
(74) Attorney, Agent, or Firm—Sughrue Mion, PLLC (57) ABSTRACT

A focusing controller executes an appropriate focus jump even in a multilayer disk having layers of characteristics greatly different from each other. The focusing controller has an optical pickup including an objective lens for converging the light beam and a detector for receiving reflected light from the multilayer recording medium; an error signal generator for generating a focus error signal of the irradiated light beam from a detecting signal of the detector; an actuator for operating the objective lens; and a controller for controlling a focusing position of the light beam by operating the actuator based on the focus error signal. The controller calculates intensities of the reflected lights of two layers based on the detecting signal of the detector, and thus controls the timings of acceleration and deceleration signals of a focus jump between these two layers.

6 Claims, 7 Drawing Sheets

FOCUSING CONTROLLER FOR FOCUS JUMP CONTROL BETWEEN RECORDING LAYERS OF MULTILAYER DISK

BACKGROUND OF THE INVENTION

1. Technical Field of the Invention

The present invention relates to a focusing controller for controlling the focusing position of a light beam irradiated onto a multilayer recording medium having a plurality of recording layers.

2. Description of Background Art

In recent years, extensive efforts are being made to develop a multilayer optical disk that is capable of increasing recording capacity per one side as a recording medium of large capacity. Such a multilayer optical disk has a structure in which a plurality of reflecting recording layers are laminated. The multilayer optical disk will be explained by way of example of a dual layer DVD (digital versatile disk) having two recording layers. These recording layers have such a structure that two recording layers are spaced apart from each other via a spacer layer, so that a relatively small distance exists therebetween. These recording layers are called a first recording layer (hereinafter simply called a first layer) or a layer 0 (L0), and a second recording layer (hereinafter simply called a second layer) or a layer 1 (L1) in order from a disk surface (i.e., from the layer that is nearest to an optical pickup).

In a recording or reproducing operation of the dual layer disk, a laser beam is focused onto any recording layer, and a signal is recorded to this recording layer or the signal is reproduced from this recording layer. Furthermore, in association with the recording or reproduction operation there is a case in which the focusing position of the irradiating light beam is changed from a certain recording layer to another recording layer. Such a movement of the focusing position of the irradiating light beam between the recording layers is generally called a focus jump. For example, a focus jump is disclosed in a technical paper titled "Outline of Dual layer disk" of Kuribayashi, et al. printed in Vol. 6, No. 2 (1996), pp. 67–73 of the Journal of Pioneer R&D of Pioneer Co., Ltd.

A conventional method of the focus jump which is generally adopted will next be explained briefly with reference to the drawings.

Figure 1:
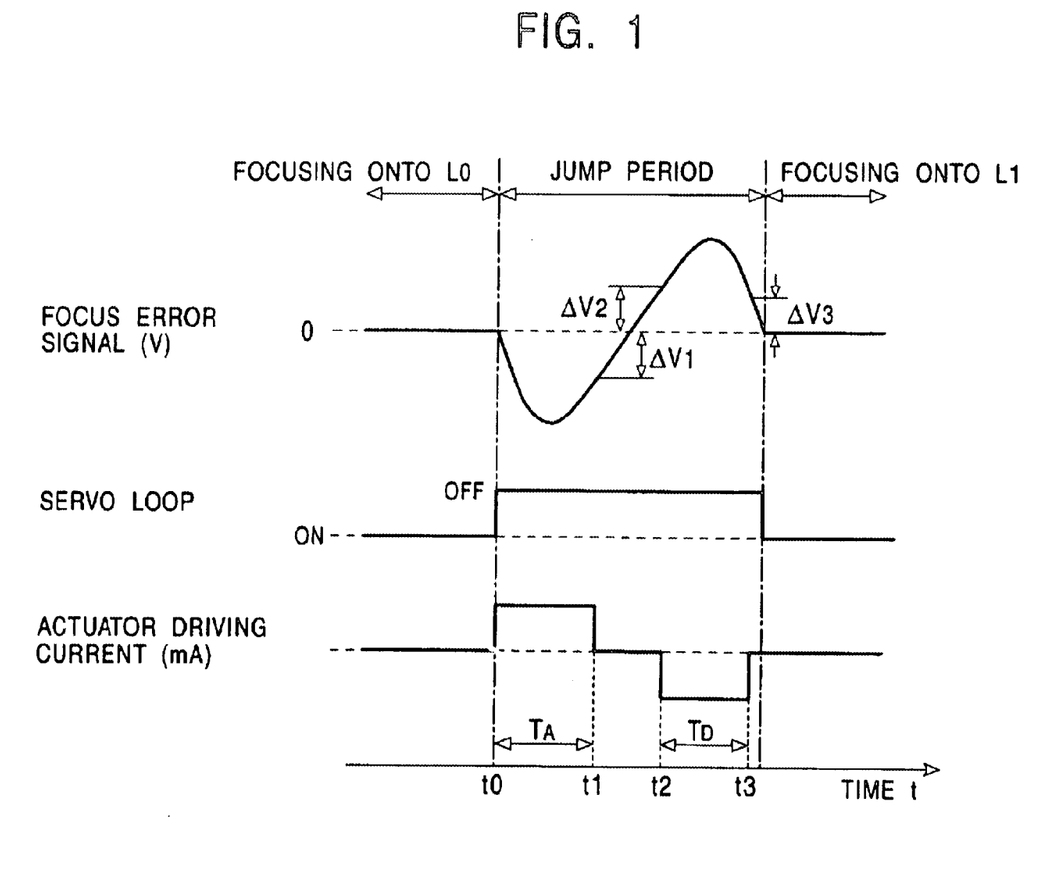
FIG. 1 is a diagram typically showing changes in a focus actuator driving electric current and a focus error signal in the case of a focus jump from a first layer (L0) to a second layer (L1).

FIG. 1 typically shows changes in a focus actuator driving electric current and a focus error signal when the focus jump takes place from the first layer (L0) to the second layer (L1). A focus actuator moves an objective lens arranged within the optical pickup in its focusing direction. For example, the focus error signal is obtained by an astigmatism method.

A focus servo is operated in a focusing state onto the L0 layer. In the focus jump, a servo loop is turned "off" at a time t0, and the objective lens is simultaneously moved toward the L1 layer by applying an acceleration pulse to the actuator for a constant period ($T_A$). When a certain recording layer is generally focused, the focus error signal shows an S-shape characteristic with respect to the shift of the focusing position. Namely, a focus error signal of the S-shape is obtained about a center at the focus position. It is necessary to move the objective lens in its focusing direction in an opening state of the focus servo loop so as to measure these characteristics of the S-shape. Accordingly, for example, in the case of the dual layer disk, two S-shape characteristics are obtained, and it is too complex to separately measure levels of these two characteristics.

The respective focus error signal characteristics of the L0 and L1 layers are synthesized in a waveform of the focus error signal obtained in the focus jump of the dual layer disk. Accordingly, as shown in FIG. 1, the focus error signal of the S-shape is obtained as the focusing position is moved from one recording layer to another.

Next, one example of the focus jump will be explained with reference to FIG. 1. When the focus jump is instructed, the servo loop is first turned "off", and the acceleration pulse is applied. Thus, a focal point is separated from the L0 layer, and passes through a peak position. When the focus error signal level reaches a predetermined threshold value ($\Delta V1$) (at a time t1), the application of the acceleration pulse is stopped. Namely, the acceleration pulse ($T_A$) is applied. The focus error signal of the L1 layer appears as the focal point approaches the L1 layer. When the focus error signal level reaches a predetermined threshold value ($\Delta V2$) (at a time t2), a deceleration pulse having a polarity reverse to the polarity of the acceleration pulse is applied to the actuator. Thus, the objective lens is decelerated. Further, when the focus error signal level reaches a predetermined threshold value ($\Delta V3$) (at a time t3), the application of the deceleration pulse is stopped. Namely, the deceleration pulse ($T_D$) is applied from t2 to t3. Thereafter, the servo loop is set to the "on" state. In this way, the focus jump from the L0 layer to the L1 layer is executed.

Figure 2:
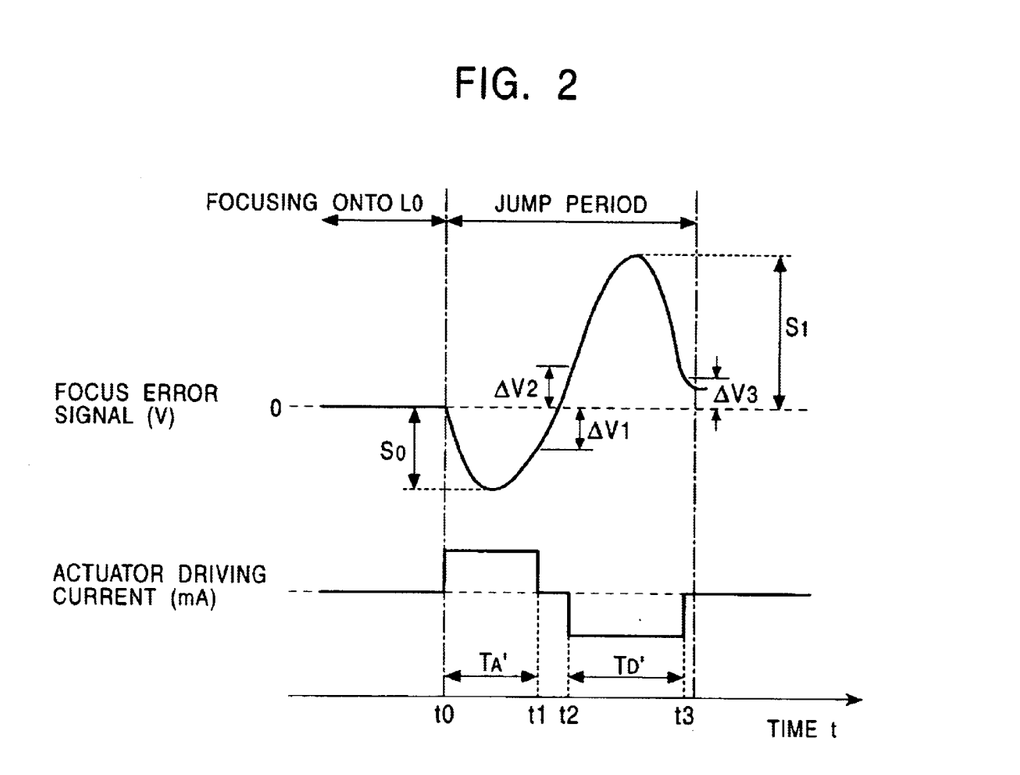
FIG. 2 is a diagram typically showing a case in which respective focus error signal levels $S_0$, $S_1$ of the L0 layer and the L1 layer are greatly different from each other ($S_0 < S_1$), which leads to a failure of the focus jump.

However, when the focusing control system operates with a multilayer disk having a different focus error signal characteristic in each of recording layers, there is a possibility that the focus jump process shown in FIG. 1 does not work properly. For example, as shown in FIG. 2, when the respective focus error signal levels $S_0$, $S_1$ of the L0 and L1 layers are greatly different from each other ($S_0 < S_1$), a deceleration pulse generating period ($T_D'$) is prolonged in comparison with the case of FIG. 1. In the worst case, there is a possibility that the focus jump fails because no focusing position reaches a target layer (L1 layer). Otherwise, a converging time in the servo control is prolonged because of a deviation of the deceleration pulse from an optimum deceleration pulse.

OBJECT AND SUMMARY OF THE INVENTION

The present invention has been made in view of the points described above, and an object of the present invention is to provide a simple focusing controller of high performance that performs control operations in consideration of the characteristic of each disk.

A focusing controller according to the present invention is a controller that performs focusing control of a light beam irradiated to a multilayer recording medium having a plurality of recording layers, and comprising an optical pickup including an objective lens for converging the light beam and a detector for receiving reflected light from the multilayer recording medium; an error signal generator for generating a focus error signal of the irradiated light beam from a detecting signal of the detector; an actuator for operating the objective lens; and a controller for controlling a focusing position of the light beam by operating the actuator based on the focus error signal; wherein the controller calculates intensities of the reflected lights of two layers based on the detecting signal of the detector, and thus controls the timing of a control signal for a focus jump between the two layers.

DETAILED DESCRIPTION OF THE EMBODIMENTS

The embodiments of the present invention will next be explained in detail with reference to the drawings.

Figure 3:
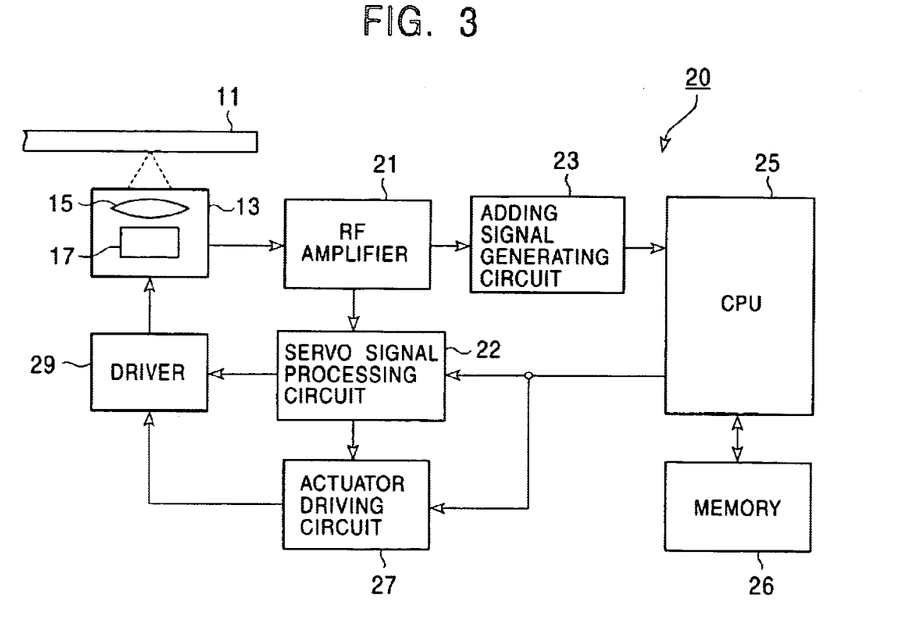
FIG. 3 is a block diagram showing the construction of a focusing controller in an embodiment of the present invention.

FIG. 3 is a block diagram showing the construction of a focusing controller 20 in an embodiment of the invention. An unillustrated laser beam source and an objective lens 15 are arranged in an optical pickup 13. A light beam from this laser beam source is focused by means of the objective lens 15 and irradiated onto a multilayer optical disk 11 having a plurality of recording layers. In the following description, a dual layer DVD having two recording layers will be explained as an example. Light reflected on the DVD 11 is converged by the objective lens 15, and received by a photo detector 17.

The photo detector 17 is constituted by a plurality of light receiving elements, and e.g., a 4-division photo detector is used. The 4-division photo detector 17 is constituted by four light receiving elements having four divided light receiving faces in a direction along a recording track (groove track) of the DVD 11 and a direction (radial direction) perpendicular to the recording track. The reflected light from the DVD 11 is received by each of these four light receiving elements, and is respectively individually converted to an electric signal and is in turn outputted. Each converted signal is amplified in an RF amplifier 21, and is then supplied to a servo signal processing circuit 22 and an adding signal generating circuit 23 as reading signals R1 to R4.

In the servo signal processing circuit 22, a focus error signal FE and a tracking error signal TE are generated based on the reading signals R1 to R4. The generated focus error signal (FE) and the generated tracking error signal (TE) are supplied to an actuator driving circuit 27 so that an actuator driving signal is generated. The actuator driving signal is supplied to the optical pickup 13 through a driver circuit 29, and focus control and tracking control are performed. Such focus control will be explained more concretely. In the ease of the 4-division photo detector, a sum signal of output signals of two sets of two photo detecting elements is calculated in an individual adder (not shown). The two photo detecting elements in each set are those photo detecting elements located in point-symmetrical positions about a center at a crossing point of two divisional lines of the light receiving face of the photo detector. For example, when the four photo detectors (d1 to d4) are sequentially arranged in the clockwise direction (otherwise the counterclockwise direction) and the reading signals of the corresponding respective photo detecting elements are set to R1 to R4, two sets of sum signals (RI+R3) and (R2+R4) are calculated. The focus error signal is obtained by subtracting an output signal of one adder from an output signal of another adder by a subtracter. Namely, for example, the focus error signal is obtained as (R1+R3)(R2+R4). As mentioned above, since this focus error signal has S-curve characteristics with respect to a focus error, a central point of the S-curve characteristics is set to a reference level (e.g. 0) of the focus error signal FE. The objective lens 15 is operated in accordance with a driving signal of the driver circuit 29 so that the focus control is performed. The servo signal processing circuit 22 and the actuator driving circuit 27 are operated under the control of a controller (CPU) 25.

On the other hand, a total adding signal (R1+R2+R3+R4 in the above example) of the reading signals R1 to R4 is generated in the adding signal generating circuit 23, and is supplied to the controller 25. As described later in detail, the controller 25 executes a focus jump operation by using this total adding signal. A memory 26 for storing the level of the total adding signal, various data, the reference value, the threshold value, a parameter, etc. is connected to the controller 25.

In the following description, for brevity of the explanation, the explanation will be made by way of example of a case in which the optical disk 11 is constructed by a dual layer DVD having two recording layers (L0 and L1 layers) and the focus jump is taken from the L0 layer to the L1 layer.

Figure 4:
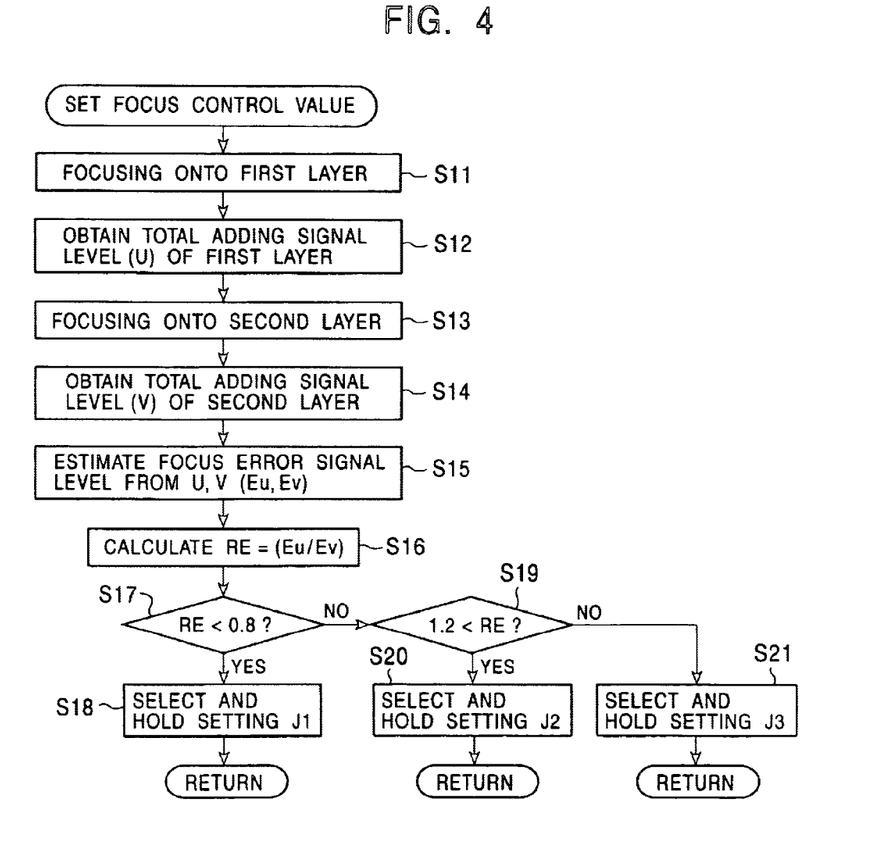
FIG. 4 is a flowchart showing the procedure of a focus control value setting subroutine executed in the focusing controller of FIG. 3.

The initialization of a control value executed by the focusing controller 20 will be explained next with reference to the flowchart of FIG. 4.

First, the DVD 11 is loaded and subsequently the light beam is focused on the first layer (L0 layer) (step S11). Next, the intensity of reflected light from the DVD 11, i.e., the level U of a total adding signal (R1+R2+R3+R4 in the case of the 4-divisional photo detector) obtained in the adding signal generating circuit 23 is acquired (step S12). Similarly, the second layer (L1 layer) is focused (step S13), and a total adding signal level V with respect to this layer is obtained (step S14). When the total adding signal level is measured, it is not necessary to open a focus servo loop. Namely, the total adding signal level is measured in a focus closing state on a certain layer. The focus error signal level with respect to each recording layer is estimated by using total adding signal levels U, V showing the reflected light intensity at a focusing time onto each recording layer so that estimation values Eu, Ev are obtained (step S15). In the invention, the level of the focus error signal is estimated by the total adding signal. This is based on the knowledge of an approximately proportional relation of the focus error signal and the total adding signal. No complicated processing of measuring the focus error signal itself and a peak-to-peak (P—P) value is required by this technique.

Next, the ratio RE (=Eu/Ev) of an estimation value Ev with respect to the second layer (L1 layer) and an estimation value Eu with respect to the first layer (L0 layer) is calculated (step S16). It is then judged whether this ratio RE is smaller than a predetermined value Th1 (Th1<1, e.g., 0.8) or not (step S17). When it is judged that the ratio RE is the first predetermined value, it corresponds to a state in which the focus error signal level of the second layer is larger than that of the first layer. Accordingly, the controller 25 selects a combination (setting J1) of suitable acceleration and deceleration signals with respect to such a disk (step S18). These set values are utilized as a control parameter of the focus jump executed later.

Figure 6:
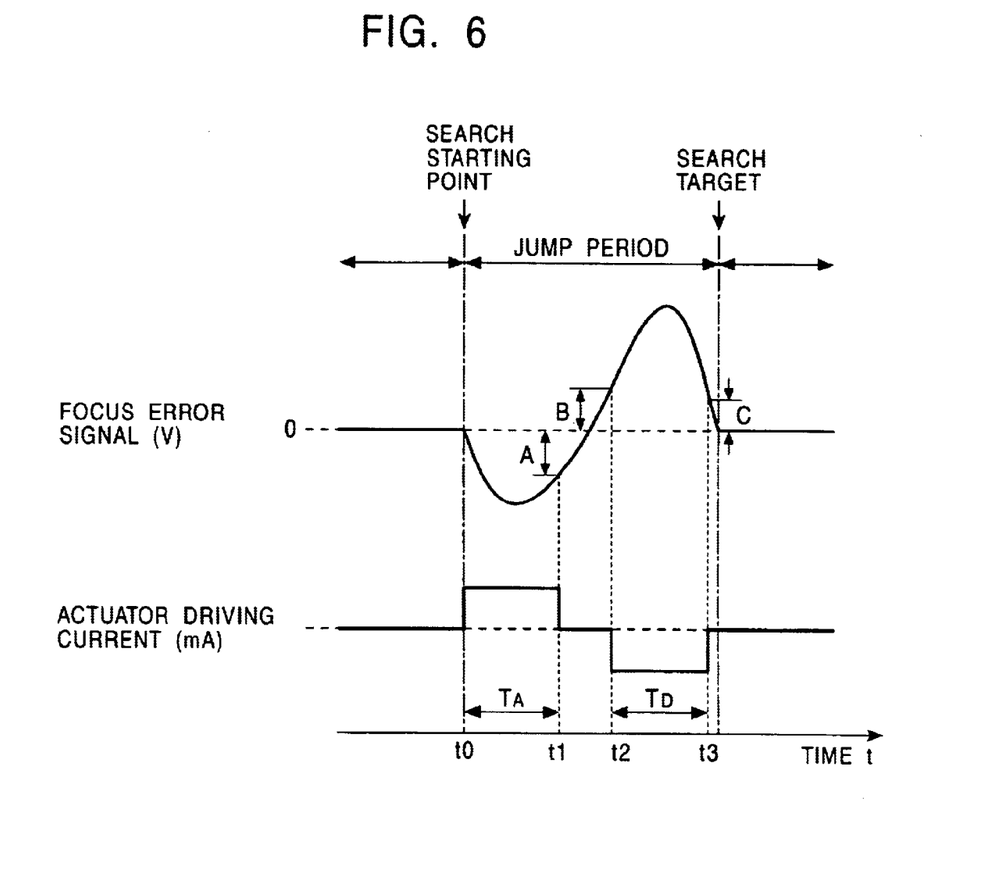
FIG. 6 is a diagram showing timings of acceleration and deceleration at a focus jump control time and a set (A, B, C) of threshold values.

The set values J1 prescribe timings and levels of the acceleration and deceleration signals at the focus jump time between the first and second layers. For example, as shown in FIG. 6, these can be represented in the shape of a threshold value with respect to the focus error signal between a search starting point and a search target.

The threshold values required for the focus jump from the first layer to the second layer are respectively prescribed as A12, B12 and C12, and are set to set values for the jump from the first layer to the second layer. Similarly, the threshold values required for the focus jump from the second layer to the first layer are respectively prescribed as A21, B21 and C21 and are set to set values required for the jump from the second layer to the first layer. This information is included in the set value J1.

In step S17, when it is judged that ratio RE is not smaller than the first predetermined value, it is further judged whether the ratio RE exceeds a second predetermined value Th2 (Th2>1, e.g., 1.2) or not (step S19). When it is judged that the ratio RE is the second predetermined value, it corresponds to a state in which the focus error signal level of the second layer is smaller than that of the first layer. Accordingly, the controller 25 selects a combination (setting J2) of suitable acceleration and deceleration signals with respect to such a disk (step S20). These set value are utilized as control parameters of the focus jump executed later.

Similar to the set values J1, with respect to the set values J2, the threshold values required for the focus jump from the first layer to the second layer are respectively prescribed as A'12, B'12 and C'12, and are set to set values for the jump from the first layer to the second layer. Similarly, values prescribed as threshold values A'21, B'21 and C'21 required for the focus jump from the second layer to the first layer are set to set values required for the focus jump from the second layer to the first layer. This information is included in the set values J2.

When it is judged in step S19 that ratio RE is not greater than the second predetermined value, it is judged that the focus error signals of the first and second layers are approximately equal to each other. Accordingly, the controller 25 selects a combination (setting J3) of suitable acceleration and deceleration signals with respect to such a disk (step S21). These set values are utilized by a user as control parameters of the focus jump executed later.

Similar to the set values J31 and J32, the set values J3 prescribe timings and levels of the acceleration and deceleration signals at a focus jump time. The threshold values required in the focus jump from the first layer to the second layer are respectively prescribed as A"12, B"12 and C"12, and are set to set values for the jump from the first layer to the second layer. Similarly, values prescribed as threshold values A"21, B"21 and C"21 required for the jump from the second layer to the first layer are set to set values required for the focus jump from the second layer to the first layer. This information is Included in the set values J3.

These set values J1 to J3 cannot be set when the total adding signal of the second layer has not been obtained. Accordingly, since no optimum set value can be set at a time point of the step S13, there is a possibility of generation of the above-mentioned problem. Therefore, in the step S13, for example, it is necessary to use a technique in which the second layer is first focused on trial at the set values J3, and the set values are changed to J1 (J2) and the focusing is retried if no second layer can be focused even in a plurality of retry controls.

Figure 5:
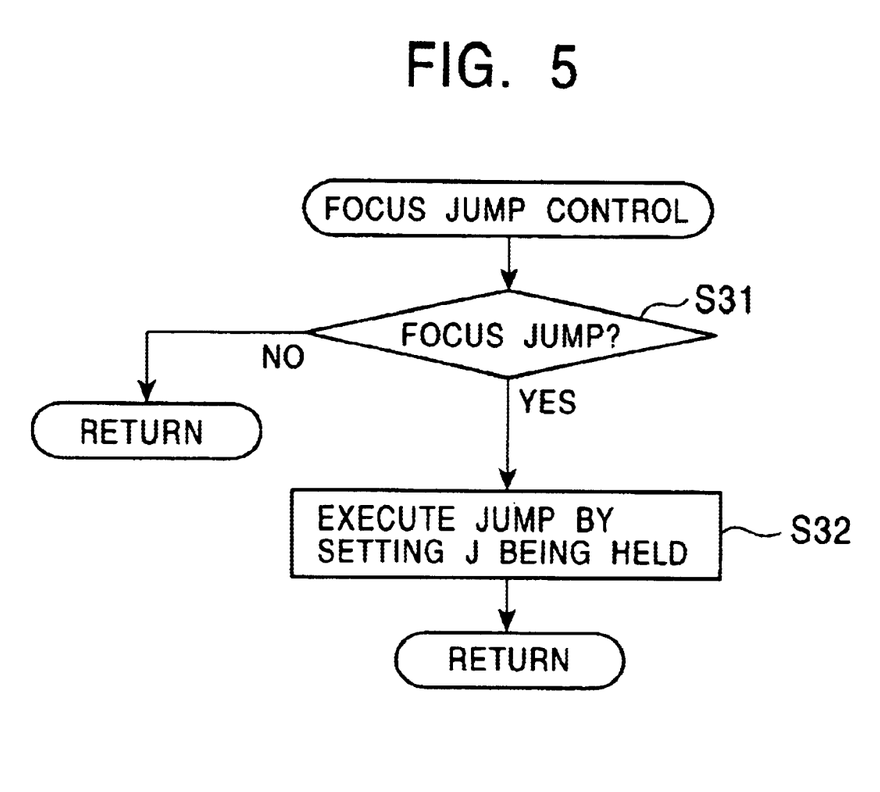
FIG. 5 is a flowchart showing the procedure of a focus jump control subroutine executed in the focusing controller of FIG. 3.

Next, the procedure of a focus jump operation utilizing the above set values will be explained with reference to the flow chart of a subroutine of the focus jump shown in FIG. 5. First, the controller 25 judges whether the execution of the focus jump is required at the recording or reproducing time or not (step S31). When no execution of the focus jump is required, it is returned to a main routine. In contrast to this, when the execution of the focus jump is required, the focus jump is executed in the set J (i.e., one of J1, J2 and J3) held by executing a focus control value set subroutine (step S32). Since the focus jump is explained in detail with reference to FIG. 1, its explanation is omitted here.

The focus jump can be preferably executed by the above procedure even when there is a large difference in the focus error signal level between the respective recording layers.

Further, in the above embodiment, the explanation is made with respect to the case in which the set (Ai, Bi and Ci) (i=1 to 3) of constant threshold values is determined in advance with respect to the set Ji. However, as described below in detail, it is also possible to adopt an arrangement that the threshold value according to the measured total adding signal level is calculated. The focus jump control in such a case will be explained with reference to the flow chart shown in FIG. 7.

Figure 7:
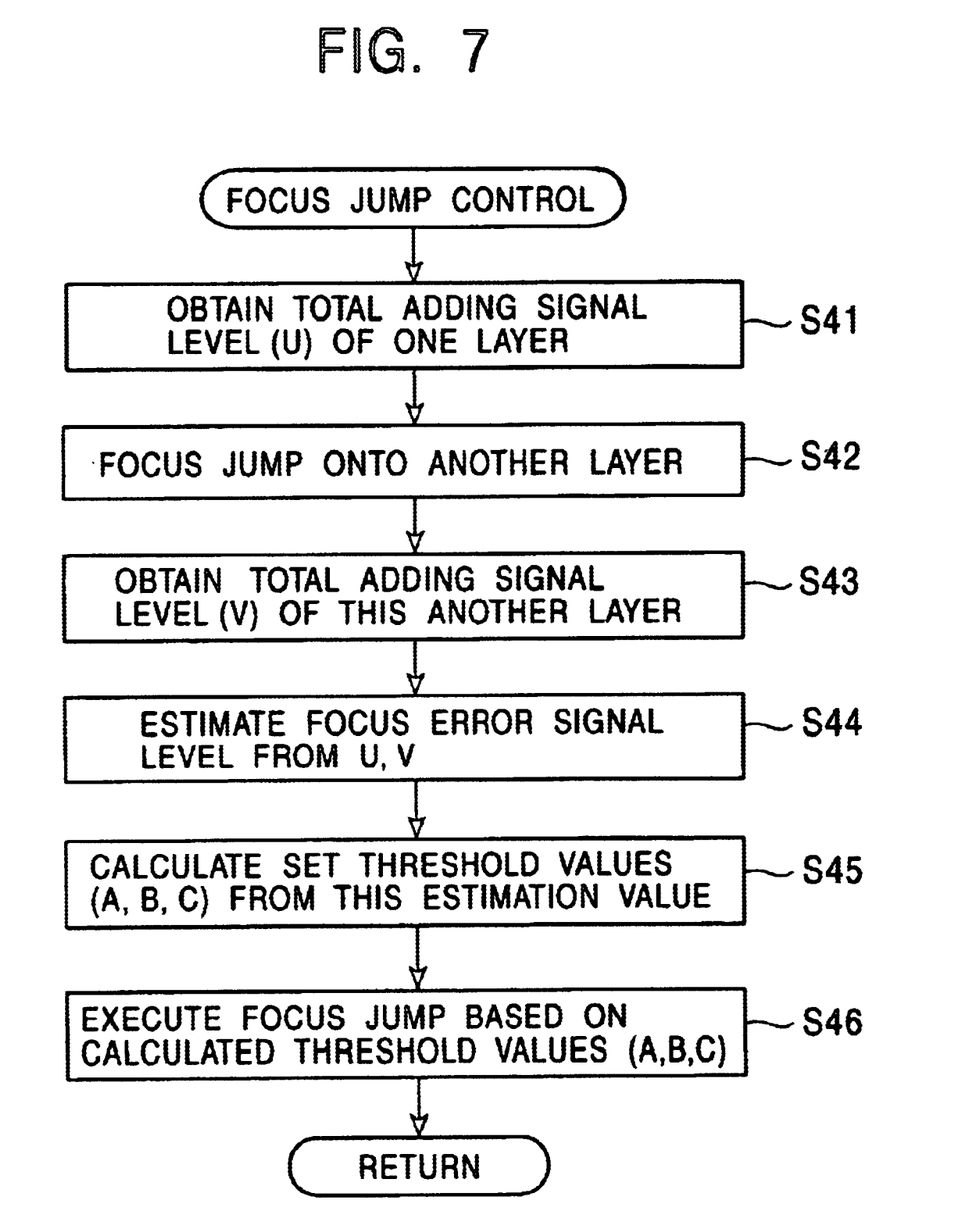
FIG. 7 is a flowchart showing the procedure of focus jump control executed by calculating the threshold value according to a measured total adding signal level.

First, the total adding signal level (U) is obtained with respect to one recording layer of the multilayer disk 11 having a plurality of recording layers (step S41). Next, the focus jump to another recording layer is effected (step S42), and the total adding signal level (V) of this another recording layer is obtained (step S43). The focus error signal level is estimated from the obtained total adding signal levels U, V of this one recording layer and this another recording layer (step S44). Set threshold values A, B and C (set J) are then calculated from this estimation value of the focus error signal level (step S45). One example of calculating methods of such threshold values A, B and C in the set J will next be explained in detail.

In a reproducer in which the total adding signal level and the focus error signal level are approximately set to a proportional relation, the estimation values of the focus error signal levels with respect to the first and second layers can be respectively represented as aU and aV when the total adding signal levels of the first and second layers are respectively set to U and V. Here, the value a is a proportional coefficient.

For example, when the focus jump is effected from the first layer to the second layer, an acceleration time is too long when the total adding signal level of the first layer is large. On the other hand, when the total adding signal level of the second layer to which the jump is taken is large, a deceleration time is too long. For example, $A = P(aU/W) + f$ is set to correct this when a design standard value of the focus error signal level is set to W. Here, p is a coefficient for increasing and decreasing the threshold value when the estimation value of the focus error signal level is increased and decreased from its design central value. Further, f is a constant for determining the threshold value when the estimation value of the focus error signal level is the design central value. Thus, the correction is made such that the threshold value of acceleration termination is increased as the total adding signal level of the first layer is increased, and the threshold value of the acceleration termination is decreased as this total adding signal level is decreased.

Further, with respect to timing of the deceleration, the following formulas are set.

$$B=q(aV/W)+g$$

$$C=r(aV/W)+h$$

Here, similar to p, values q and r are coefficients for increasing and decreasing the threshold value when the estimation value of the focus error signal level is increased and decreased from the design central value. Further, g and h are similarly constants for determining the threshold value when the estimation value of the focus error signal level is the design central value.

Namely, aU=aV=W is set when the estimation value of the focus error signal level is the design central value as a special case. Accordingly, A=p+f, B=q+g and C=r+h are formed.

The focus jump is executed based on the threshold values A, B and C calculated in this way (step S46).

Through the processes described above, it is possible in accordance with this embodiment to realize a focusing controller of high performance that is capable of executing the focus jump according to the difference in the focus error signal level between the respective recording layers.

In the above description, explanation has been made only with respect to the case where the focus jump from the first layer to the second layer is performed. However, it is possible to combine a procedure for selecting the setting J (e.g., J4, J5, J6, etc.) from the ratio of the estimation value of the focus error signal level in the case of the execution of the focus jump from the second layer to the first layer. Thus, a preferable focus jump can be arbitrarily executed between the first and second layers at the time of a series of recording and/or reproducing operations. Further, the invention is not limited to the disk having two layers, but can also be easily applied to a multilayer disk having three recording layers or more. Furthermore, in the case of the multilayer disk having three recording layers or more, it is not necessary to perform the above setting operation with respect to the focus jump between all the recording layers. It also lies within a design range that the setting operation is performed with respect to recording layers suitably requiring the focus jump.

As explained above, in accordance with the invention it is possible to realize a simple focusing controller of high performance in which it is not necessary to measure the S-shape characteristics of each recording layer and an optimum focus jump can be executed at the recording and reproducing processes of the multilayer disk having a plurality of recording layers.

This application is based on Japanese Patent Application No. 2001-107153 which is herein incorporated by reference.

What is claimed is:

1. A focusing controller of a light beam irradiated onto a multilayer recording medium having a plurality of recording layers, comprising:

an optical pickup comprising an objective lens for converging said light beam and a detector for receiving reflected light from said multilayer recording medium;

an error signal generator for generating a focus error signal of the irradiated light beam from a detecting signal of said detector;

an actuator for operating said objective lens; and a controller for controlling a focusing position of said light beam by operating said actuator based on said focus error signal;

wherein said controller calculates intensities of reflection light beams respectively from two layers based on the detecting signal of said detector, and controls the timing of a control signal for a focus jump between said two layers based on set values for controlling the focus jump which are obtained based an said calculated intensities.

2. A focusing controller according to claim 1, wherein said detector comprises a plurality of light receiving elements, and an intensity of said reflected light beam is calculated by adding light receiving signals of said plurality of light receiving elements.

3. A focusing controller according to claim 1, wherein said controller specifies focus error signal levels of said two layers from the intensities of the reflected lights of said two layers, and controls the timing of the control signal of the focus jump between said two layers.

4. A focusing controller according to claim 3, wherein said controller controls the timings of acceleration and deceleration signals of said objective lens applied to said focus error signal.

5. A focusing controller according to claim 1, wherein said controller obtains a ratio of estimated focus error signals by using said calculated intensities of reflection light beams from two layers, and said set values are selected according to a result of comparison between said ratio and a predetermined value.

6. A focusing controller according to claim 1, wherein the periods of acceleration and deceleration signals for said focus jump are determined based on said set values.

* * * * *